United States Patent
Nelson et al.

(10) Patent No.: US 12,488,795 B2
(45) Date of Patent: Dec. 2, 2025

(54) REAL-TIME PROVISION OF GUIDANCE TO SALES-FOCUSED AGENTS OF A CONTACT CENTER BASED ON IDENTIFIABLE BACKGROUND SOUNDS

(71) Applicant: Avaya Management L.P., Durham, NC (US)

(72) Inventors: Rusty Gerald Nelson, Brighton, CO (US); Paul Roller Michaelis, Louisville, CO (US); Kevin Archer, Brighton, CO (US); Gregory Paul Schin, Highlands Ranch, CO (US)

(73) Assignee: Avaya Management L.P., Morristown, NJ (US)

(*) Notice: Subject to any disclaimer, the term of this patent is extended or adjusted under 35 U.S.C. 154(b) by 367 days.

(21) Appl. No.: 18/070,739

(22) Filed: Nov. 29, 2022

(65) Prior Publication Data

US 2024/0177711 A1    May 30, 2024

(51) Int. Cl.
| | |
|---|---|
| *G10L 15/22* | (2006.01) |
| *G06Q 30/015* | (2023.01) |
| *G06Q 30/0601* | (2023.01) |
| *G10L 25/63* | (2013.01) |
| *H04M 3/51* | (2006.01) |

(52) U.S. Cl.
CPC .......... *G10L 15/22* (2013.01); *G06Q 30/015* (2023.01); *G06Q 30/0631* (2013.01); *G10L 25/63* (2013.01); *H04M 3/5175* (2013.01); *H04M 2203/402* (2013.01)

(58) Field of Classification Search
CPC ....... G10L 15/22; G10L 25/63; G06Q 30/015; G06Q 30/0631; H04M 3/5175; H04M 2203/402
See application file for complete search history.

(56) References Cited

U.S. PATENT DOCUMENTS

| | | |
|---|---|---|
| 7,117,149 B1 | 10/2006 | Zakarauskas |
| 8,370,155 B2 | 2/2013 | Byrd et al. |
| 8,817,952 B2 | 8/2014 | Bentley et al. |
| 8,972,255 B2 | 3/2015 | Leman et al. |
| 10,083,687 B2 | 9/2018 | Gilbert |
| 10,171,656 B2 | 1/2019 | Pullamplavil et al. |
| 10,601,992 B2 | 3/2020 | Dwyer et al. |
| 10,812,656 B1 * | 10/2020 | Brooks ............... H04M 3/5175 |
| 11,055,739 B2 | 7/2021 | Balasubramanian et al. |
| 11,757,999 B1 * | 9/2023 | Skinner ................ H04L 67/141 |
| | | 709/227 |

(Continued)

*Primary Examiner* — Bhavesh M Mehta
*Assistant Examiner* — Eunice Lee (57) ABSTRACT

The technology disclosed herein enables provision of sales guidance to an agent on a real-time communication session based on background sound identified during the communication session. In a particular embodiment, a method includes receiving audio from a first endpoint operated by a first user. The audio is received over a real-time communication session established between the first endpoint and a second endpoint operated by an agent of a contact center. The method further includes identifying sound other than a voice of the first user from the audio and determining a characteristic of the first user indicated by the sound. During the communication session, the method includes providing sales guidance to the agent based on the characteristic.

20 Claims, 8 Drawing Sheets

(56) References Cited

U.S. PATENT DOCUMENTS

| | | | |
|---|---|---|---|
| 2011/0202472 A1* | 8/2011 | Wan | G06Q 10/10 |
| | | | 705/345 |
| 2015/0213512 A1* | 7/2015 | Spievak | G06Q 30/0275 |
| | | | 705/14.71 |
| 2017/0195435 A1 | 7/2017 | Sarukkai | |
| 2017/0263266 A1* | 9/2017 | Henrique Barbosa Postal | ............ |
| | | | G06F 16/9535 |
| 2018/0151174 A1 | 5/2018 | Lee et al. | |

* cited by examiner

REAL-TIME PROVISION OF GUIDANCE TO SALES-FOCUSED AGENTS OF A CONTACT CENTER BASED ON IDENTIFIABLE BACKGROUND SOUNDS

TECHNICAL BACKGROUND

Agents in contact centers often specialize in different areas. For example, an enterprise may sell a variety of products and different groups of agents may focus on different types of products. An agent with a focus in selling one product may not be versed in selling another product and may be unaware of any promotions available for that other product or if a customer may even be interested in the other product. In fact, even if the agent was aware of other products and promotions, the agent may have no idea the customer may be interested in those other products. While audio received over the communication session may provide clues about the customer's interest, the agent may not recognize those clues and/or have no idea what products/promotions are available for the agent to act on the clues for additional sales to the customer.

SUMMARY

The technology disclosed herein enables provision of sales guidance to an agent on a real-time communication session based on background sound identified during the communication session. In a particular embodiment, a method includes receiving audio from a first endpoint operated by a first user. The audio is received over a real-time communication session established between the first endpoint and a second endpoint operated by an agent of a contact center. The method further includes identifying sound other than a voice of the first user from the audio and determining a characteristic of the first user indicated by the sound. During the communication session, the method includes providing sales guidance to the agent based on the characteristic.

In some examples, providing the sales guidance includes determining an instruction for handling the first user based on the characteristic and presenting the instruction to the second user via the second endpoint. In those examples, determining the instruction may include determining an item corresponding to the characteristic in a push list, wherein the item is one of a plurality of items in the push list that correspond to different characteristics and generating the instruction, which directs the second user to push the item to the first user. Determining the instruction may also include determining a cause of a change of behavior of the first user indicated by the characteristic and generating the instruction, which directs the second user on how to account for the change in view of the cause. The change of behavior may be identified at substantially the same time as the sound. Also, in the above examples, presenting the instruction may include displaying the instruction to the second user from the second endpoint and/or audibly speaking the instruction to the second user from the second endpoint.

In some examples, providing the sales guidance includes presenting an indicator of the characteristic to the second user from the second endpoint.

In some examples, the sales guidance includes a script for the second user to read over the communication session.

In some examples, identifying the sound includes isolating the sound in the audio, comparing the sound to a plurality of sound signatures from a plurality of known sources, and identifying a matching signature from the plurality of sound signatures that matches the sound. The matching signature corresponds to one of the known sources.

In another embodiment, an apparatus is provided having one or more computer readable storage media and a processing system operatively coupled with the one or more computer readable storage media. Program instructions stored on the one or more computer readable storage media, when read and executed by the processing system, direct the apparatus to receive audio from a first endpoint operated by a first user. The audio is received over a real-time communication session established between the first endpoint and a second endpoint operated by an agent of a contact center. The program instructions further direct the apparatus to identify sound other than a voice of the first user from the audio and determine a characteristic of the first user indicated by the sound. During the communication session, the program instructions direct the apparatus to provide sales guidance to the agent based on the characteristic.

DETAILED DESCRIPTION

A sales-guidance system in the examples below automatically recognizes characteristics in audio received by a contact center from a customer's endpoint during a real-time communication session between the customer and sales-focused agent of the contact center. While the customer is likely speaking with an agent about a product(s) in which the agent specializes, the characteristics act as clues to the sales-guidance system about other products in which the customer may be interested or even what actions may help sell the customer on the product they are calling about. For example, the customer may be speaking with the agent about televisions because the agent is in a group of agents that focuses on selling electronics. The agents in that group may be trained to be knowledgeable about the electronics they will be selling (e.g., televisions). The sales-guidance system may detect a dog barking in the background audio received from the customer's endpoint. The sales-guidance system determines that the customer has a dog and may be interested in pet products about which the agent has no expertise because pet products were not part of the agent's training, and the agent is not expected to handle sales of pet products. As such, the sales-guidance system presents the agent with guidance that instructs the agent on selling pet products to the customer in addition to the televisions about which the customer is calling. For instance, the sales-guidance system may present deals in the pet supply department (e.g., for products in a push list) that customer may be interested and/or may provide a script for the agent to speak to broach the subject with the customer. Without the sales-guidance system, the agent may not have heard or recognized the dog barking in the background and, even if the agent did recognize the dog, the agent may not have known where to start with selling pet products to the customer (or even that the enterprise offered pet products in the first place), as pet products were not part of the agent's training or the agent's sales focus.

Figure 1:
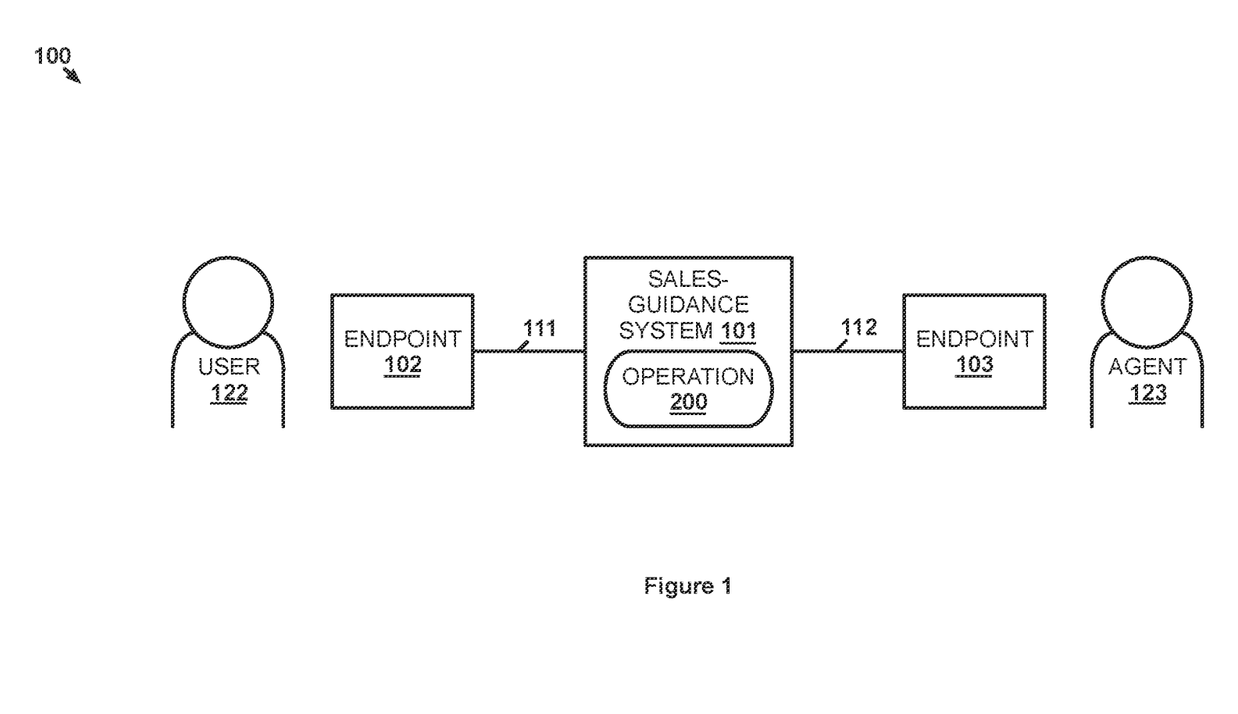
FIG. 1 illustrates an implementation for guiding an agent on a real-time communication session based on background sound identified during the communication session.

FIG. 1 illustrates implementation 100 for guiding an agent on a real-time communication session based on background sound identified during the communication session. Implementation 100 includes sales-guidance system 101, endpoint 102, and endpoint 103. Endpoint 102 and sales-guidance system 101 communicate over communication link 111. Endpoint 103 and sales-guidance system 101 communicate over communication link 112. Communication links 111-112 are shown as direct links but may include intervening systems, networks, and/or devices.

Figure 2:
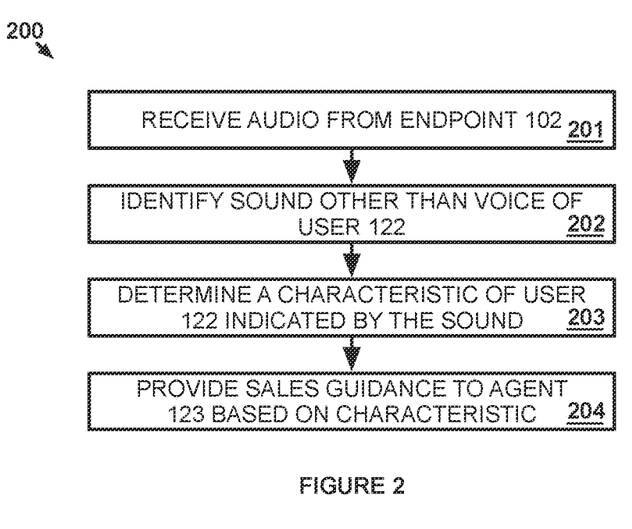
FIG. 2 illustrates an operation to guide an agent on a real-time communication session based on background sound identified during the communication session.

Endpoint 102 is operated by user 122 and endpoint 103 operated by agent 123 who is a user at a contact center (e.g., employed or contracted by the contact center operator) tasked with selling products to customers that call the contact center or are called by the contact center. When a real-time communication session is established between endpoint 102 and endpoint 103, audio communications are exchanged over the communication session enabling user 122 to speak with agent 123 in real time. Other types of communications, such as video communications, may also be exchanged in other examples. While sales-guidance system 101 is shown in the communication path between endpoint 102 and endpoint 103, sales-guidance system 101 may receive at least the audio communications from endpoint 102 in some other manner (e.g., a copy of the audio communications may be sent to sales-guidance system 101 in addition to being sent to endpoint 103). Sales-guidance system 101 performs operation 200 to process those audio communications to identify background sounds (i.e., sounds other than user 122's voice) captured in those audio communications and provide sales guidance to agent 123.

FIG. 2 illustrates operation 200 to guide an agent on a real-time communication session based on background sound identified during the communication session. In operation 200, sales-guidance system 101 receives audio from endpoint 102 over a real-time communication session established between endpoint 102 and endpoint 103 (201). Endpoint 102 captures sound (e.g., via a microphone built into endpoint 102 or otherwise connected thereto) to generate the audio and transmits the audio over the communication session. The captured sound may include sounds other than user 122's voice. Those other sounds may be referred to as background sounds, as they are not intended to be part of the conversation between user 122 and agent 123. The communication session over which the audio is transmitted may be an audio call, a video call, or some other type of session that enables real-time voice communications. The communication session may be established using any circuit switched and/or packed-based protocol.

From the received audio, sales-guidance system 101 identifies sound other than a voice of user 122 (202). The sound may be any sound that could occur in the vicinity of endpoint 102 such that the sound can be captured by endpoint 102. For example, the sound could be a dog barking, baby crying, a television program, a radio program, music, construction noise (e.g., jackhammer outside), lawn care noise (e.g., lawn mower), a voice other than user 122's voice, television, radio, or any other type of sound. Sales-guidance system 101 may identify user 122's voice as being the most prominent voice in the audio (e.g., loudest because user 122 is likely closest to the microphone), especially if more than one voice is present, may identify user 122's voice as being a voice speaking words that correspond to words being said by agent 123 (e.g., may use speech-to-text algorithms and/or natural language processing), may identify user 122's voice from a voice signature for user 122 (e.g., a signature may be created from a previous communication, from earlier in the present session, or user 122's interactions with an interactive voice response system), or user 122's voice may be identified in some other manner. Once user 122's voice has been identified, sales-guidance system 101 can identify sound in the audio that is not user 122's voice. Sales-guidance system 101 may maintain, or otherwise have access to, a library of sound signatures to which the identified sound is compared to identify a match. Sales-guidance system 101 may also feed the audio into a machine learning algorithm that was trained to identify sounds. In some examples, the machine learning algorithm may be fed the audio with user 122 still included thereon while, in other examples, sales-guidance system 101 may filter out user 122's voice prior to feeding the audio into the machine learning algorithm. In some examples, sales-guidance system 101 may identify more than one sound other than user 122's voice in the audio. The other sound(s) may occur at the same time in the audio (e.g., there may be multiple activities going on in the background) or the other sound may occur at different times in the audio).

Sales-guidance system 101 determines a characteristic of user 122 indicated by the sound (203). The characteristic may be anything that indicates how agent 123 should approach selling products to user 122 and/or indicates products user 122 may be interested in purchasing. For example, if the sound is a dog barking, then the characteristic may be that user 122 owns, or is caring for, a dog. Similarly, if the sound is a baby crying, then the characteristic may be that user 122 is a new parent. A sound, such as a baby crying, may also indicate an emotional state of user 122 that could be the characteristic (e.g., the characteristic may be that user 122 is overwhelmed at the moment). In some examples, the sound may be a person, or people, talking in the background and may differentiate between different age groups (e.g., a child may sound different than an adult). Sales-guidance system 101 may determine what is said in the background to determine the characteristic. For instance, the person may be speaking about an upcoming island vacation and the determined characteristic from that sound may be that the user will be going to the beach. While only one characteristic is determined in this example, multiple characteristics may be determined from the same sound or multiple characteristics may be determined from multiple sounds identified from the audio.

Sales-guidance system 101 provides sales guidance to agent 123 based on the characteristic (204). The sales guidance is provided during the communication session to enable agent 123 to follow the guidance via the session and account for the characteristic. The sales guidance may indicate the characteristic that led sales-guidance system 101 to provide the sales guidance or may not reference the characteristic. The sales guidance may include tips to better close a sale with user 122 (e.g., words/phrases to use on the session), identification of products/services in which user 122 may be interested, information about the products/service (e.g., pricing information, sale offers, product features, etc.), or some other information that agent 123 may use to better sell products/services user 122. In some examples, the guidance may be provided in real time as sales-guidance system 101 identifies sounds and determines characteristics in real time. In some examples, sales-guidance system 101 may analyze the conversation between user 122 and agent 123 to determine a point where the guidance would be best acted upon by agent 123 (e.g., sales-guidance system 101 may wait for a pause in the conversation to guide agent 123 towards selling a product pertaining to the determined characteristic). The sales guidance may be displayed to agent 123 via endpoint 103 and/or may be audibly presented to the user via endpoint 103. For example, an application executing on endpoint 103 may communicate with sales-guidance system 101 (e.g., sales-guidance system 101 may send a message with the guidance) to display sales guidance to agent 123 (e.g., present text with information to assist agent 123 in achieving a sale). In some cases, the application may instead, or in addition, audibly present the sales guidance through speakers of endpoint 103 to agent 123. For instance, agent 123 may be wearing a communications headset and a synthesized or prerecorded voice may direct agent 123 to push particular products corresponding to the characteristic. In that situation, agent 123 may also automatically direct a sales application to an interface for accepting orders for those products at the direction of the received sales guidance. In a similar situation, the sales guidance may include endpoint 103 being directed to open the interface without any other context (e.g., without an accompanying audio message or displayed text instruction) and rely on the agent to understand what needs to be done (i.e., to sell the products displayed). In examples where sales-guidance system 101 is in the communication path between endpoint 102 and endpoint 103, sales-guidance system 101 may inject audio into the user communications received by endpoint 103 such that endpoint 103 plays the audio to agent 123 as it would audio received from endpoint 102. Endpoint 103 would, therefore, not require any specialized application executing thereon to provide the sales guidance. Sales-guidance system 101 may similarly inject visual sales guidance into a video stream if the communication session supports video real-time communications.

Sales-guidance system 101 may generate the sales guidance in response to the characteristic (or characteristics if multiple characteristics have been identified) or sales-guidance system 101 may reference pre-defined sales guidance corresponding to identified characteristics (e.g., characteristic A may correspond to item of sales guidance Y in a structure associating characteristics and corresponding items of sales guidance). In some examples, sales-guidance system 101 may use a combination of generated information and pre-defined information in the sales guidance. For instance, sales-guidance system 101 may generate a script for agent 123 to recite to user 122 for selling a product within the context of the conversation and may retrieve a pre-defined instruction to open a sales interface. Both the script and the sales interface are provided by sales-guidance system 101 as the sales guidance.

In some examples, sales-guidance system 101 may determine that the characteristic explains a change in behavior of user 122. In those examples, sales-guidance system 101 may include a tip(s) for handling the change in behavior in view of the characteristic. The change in behavior may be identified by sales-guidance system 101 processing user 122's voice to identify a change in the tone of user 122's voice, identify certain words associated with different behaviors, or may identify user 122's behavioral change in some other way. In an example scenario, the characteristic may indicate that user 122 has an infant due to identifying the infant crying in the background sound. Sales-guidance system 101 may also determine that user 122's responses became terse at around the same time that the sound was identified when user 122 had been behaving in a more relaxed manner prior. Sales-guidance system 101 may then generate and provide sales guidance directing agent 123 to offer a callback to user 122 at a later time (e.g., may provide a text box displaying "It sounds like the customer is stressed due to baby, please offer a callback to help the customer).

Advantageously, sales-guidance system 101 automatically recognizes background sound captured from endpoint 102 and provides sales guidance to agent 123 based on that sound. There may be situations where agent 123 cannot hear the sound (e.g., endpoint 103 may suppress background noise including the sound when presenting the session audio to agent 123 or the sound may be too low for agent 123 to recognize) and, in those situations, sales-guidance system 101 may still be able to recognize the sound to provide sales guidance based thereon. Even if agent 123 can hear the sound themselves, agent 123 may not have any idea how to address the sound from a sales perspective or may be too involved in their current tasks to pay any mind to the sound. Thus, sales-guidance system 101 is even able to assist in situations where a human user would be incapable of acting on their own.

While the above examples focus on agents of a contact center, there may be other scenarios where provision of sales guidance by sales-guidance system 101 may be beneficial. For example, a customer-facing employee that is not part of a contact center (e.g., an employee at a retail store) may have their customer calls monitored by sales-guidance system 101 to provide sales guidance (e.g., the employee may be in a specific department and the sales guidance could suggest items to the customer from another department of the store). If sales-guidance system 101 does not perform operation 200 by default, the employee may enable a setting from their endpoint whenever they desire sales guidance from sales-guidance system 101.

Figure 3:
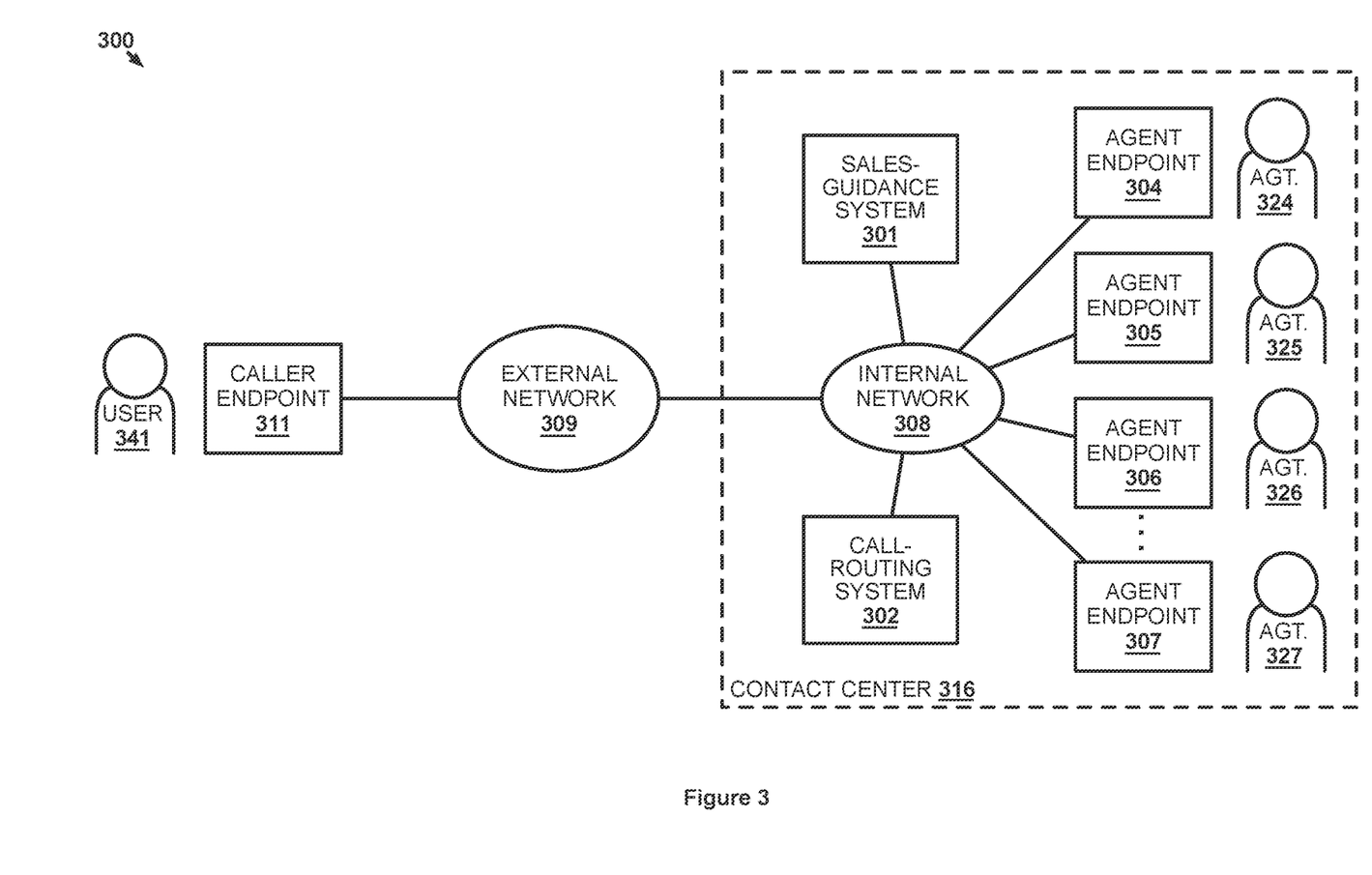
FIG. 3 illustrates an implementation for guiding an agent on a real-time communication session based on background sound identified during the communication session.

FIG. 3 illustrates implementation 300 for guiding an agent on a real-time communication session based on background sound identified during the communication session. Implementation 300 includes sales-guidance system 301, call-routing system 302, agent endpoints 304-307, internal network 308, caller endpoint 311, and external network 309. Although, sales-guidance system 301, call-routing system 302, agent endpoints 304-307, and internal network 308 are part of contact center 316, no element of contact center 316 need be co-located with another. As such, internal network 308 may use external network 309, and possibly other networks, to exchange communications. While only four agent endpoints are shown in implementation 300, contact center 316 may include any number of agent endpoints.

In this example, agent endpoints 304-307 are operated by respective agents 324-327 as agents of contact center 316 and caller endpoint 311 is operated by user 341 who is a caller to contact center 316. The real-time communication session in this example is referred to as simply a call enabling user 341 to speak in real time with an agent of contact center 316. Call-routing system 302 receives calls directed towards contact center 316 and determines to which of agent endpoints 304-307 each call should be routed. If an agent system is not currently available to handle a call (or at least an agent system acceptable to call-routing system 302 is not available), then call-routing system 302 may place a call into a queue until an agent system is available. Sales-guidance system 301 monitors audio received from caller endpoints, such as caller endpoint 311, during calls connected to agent endpoints 304-307 to provide sales guidance to agents 324-327 based on background sounds identified during those calls.

Figure 4:
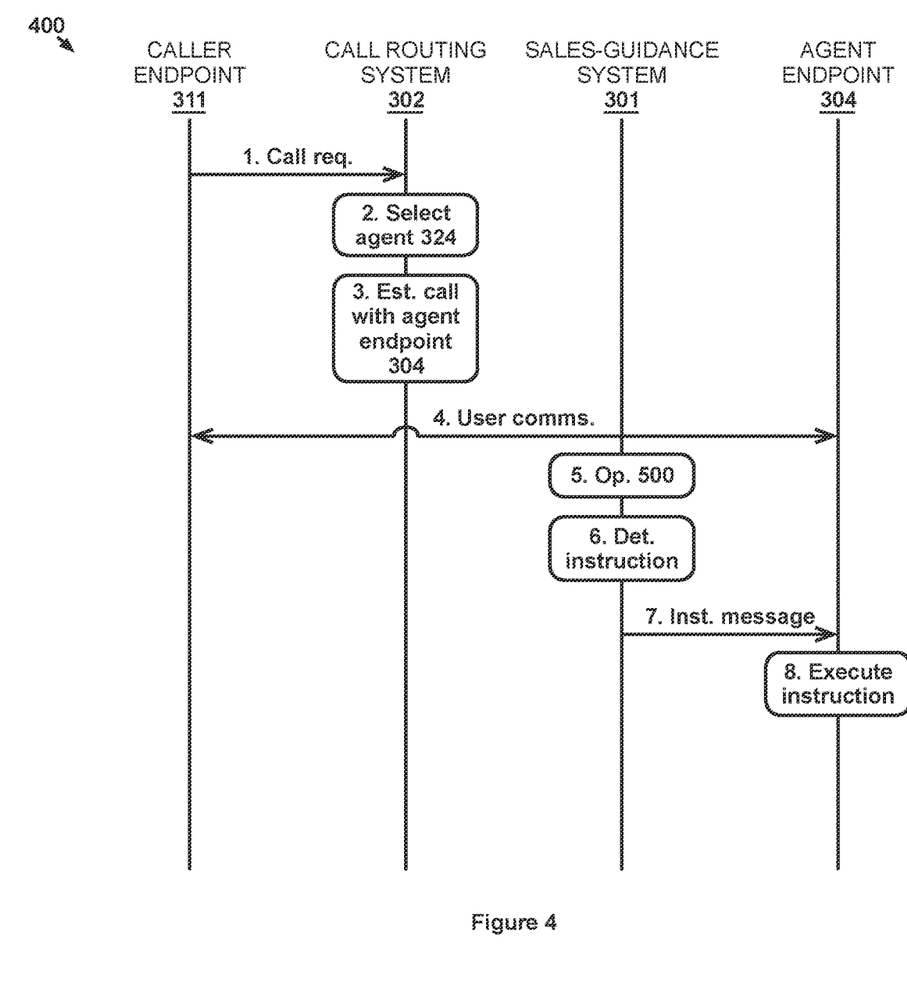
FIG. 4 illustrates an operational scenario for guiding an agent on a real-time communication session based on background sound identified during the communication session.

FIG. 4 illustrates operational scenario 400 for guiding an agent on a real-time communication session based on background sound identified during the communication session. In operational scenario 400, user 341 wishes to purchase a product from an entity (e.g., business enterprise) represented by agents 324-327 of contact center 316. Even if user 341 could purchase the product through other channels (e.g., a website), user 341 may have questions that an agent can answer about the product. To speak with an agent, user 341 directs caller endpoint 311 to request a call with an agent of contact center 316 at step 1. The call may be requested using traditional PSTN signaling, using a packet telecommunications protocol(s), or some combination thereof (e.g., a PSTN call from caller endpoint 311 may be converted to a packet-based call somewhere in external network 309). The call request is received into call-routing system 302 of contact center 316.

Upon receiving the call request, call-routing system 302 selects agent 324 at step 2 to handle the call. Call-routing system 302 may select agent 324 based on agent 324's expertise regarding the product about which user 341 is calling or may select agent 324 using some other criteria. Although not shown, contact center 316 may employ an interactive voice response (IVR) system, or some other type of automated information gathering system, to query user 341 about their reason for calling contact center 316. The call would be connected to that querying system when the call request is received at contact center 316 and the information obtained from user 341 is passed to call-routing system 302 for use as a basis for selecting an agent. If more than just agent 324 are qualified to handle the call with user 341 call-routing system 302 may select agent 324 at random or may use some other criteria that indicates which agent to select. In some cases, all agents qualified to handle the call may be unavailable (e.g., handling other calls) when the call request from caller endpoint 311 is received at call-routing system 302. Call-routing system 302 may maintain a queue into which the call request is placed until an agent comes available.

Figure 5:
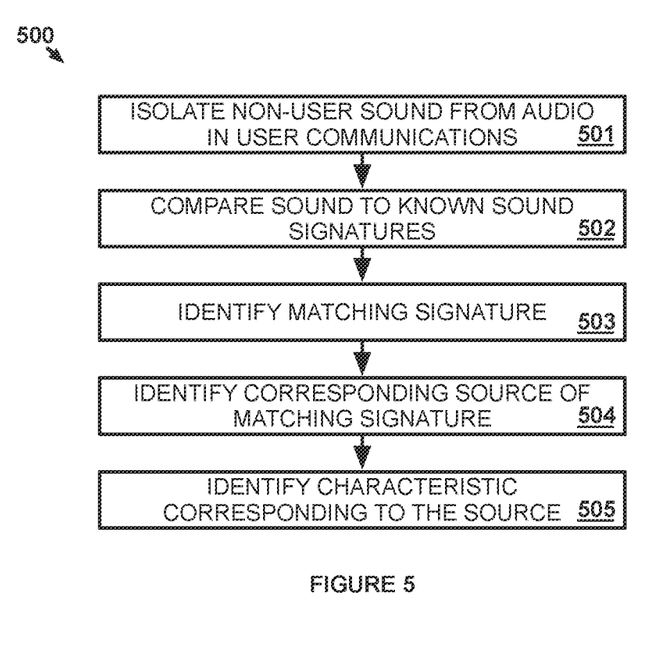
FIG. 5 illustrates an operation to guide an agent on a real-time communication session based on background sound identified during the communication session.

After selecting agent 324, call-routing system 302 connects the call at step 3 with agent endpoint 304 operated by agent 324. After the call is connected, user communications of user 341 and agent 324 are exchanged over the call at step 4 between caller endpoint 311 and agent endpoint 304. The user communications at least include real-time audio enabling user 341 and agent 324 to participate in a real-time voice conversation over the call. In this example, the call is connected through sales-guidance system 301, which enables sales-guidance system 301 to receive and process audio of user communications transmitted from caller endpoint 311. In other examples, sales-guidance system 301 may receive the audio in some other manner. For example, a system, such as call-routing system 302, may remain in the call path and send the audio to both agent endpoint 304 and sales-guidance system 301 upon receipt from caller endpoint 311. Regardless of how sales-guidance system 301 receives the audio, sales-guidance system 301 performs operation 500 on the audio to provide sales guidance to agent 324.

FIG. 5 illustrates operation 500 to guide an agent on a real-time communication session based on background sound identified during the communication session. When performing operation 500, sales-guidance system 301 isolates non-user sound from within the audio received from caller endpoint 311 over the call (501). Non-user sound is any sound that is not user 341's voice. Sales-guidance system 301 may recognize the sound of words being spoken generally to recognize user 341's voice (and may differentiate a voice spoken directly into a microphone of caller endpoint 311 versus a voice captured in the background), may recognize an audio signature of user 341's voice specifically (e.g., using a voice signature generated when user 341 spoke to an IVR system or during a previous call), or may use some other technique to differentiate the voice of user 341 relative to other sounds received on the call. In some examples, sales-guidance system 301 may further isolate more than one distinct sound occurring in the background (i.e., sounds coming from different sources that are not user 341's voice) from one another to ensure proper sound identification in the next step of operation 500. Sales-guidance system 301 may use a difference threshold for sound frequencies to determine that sound is coming from different sources. For instance, a baby may be crying at the same time as a dog is barking. Sales-guidance system 301 may, therefore, use the threshold to determine that the dog barking is from a different source as the baby crying. Although, at this point, sales-guidance system 301 does not know the source of the sounds.

Upon isolating the sound, sales-guidance system 301 compares the sound to known sound signatures accessible to sales-guidance system 301 (502). This step relies on sounds from similar sources having similar frequency characteristics that are defined by the signatures. In some cases, multiple sound signatures may define the same type of sound. For instance, depending on the dog, the sound of a dog barking may be higher pitched, lower pitched, or somewhere in-between. Multiple signatures may exist that all correspond to a dog barking to increase the chances that a dog barking will be properly identified as such. Although, in some examples, a more specific sound identification may be desired. Using the dog barking example, a sound signature may correspond to a small dog barking while another sound signature may correspond to a big dog barking, as the size of the dog may affect which products are relevant to sales guidance.

Sales-guidance system 301 identifies the matching signature from the caparison (503). In situations where no matching signature is found, operation 500 may simply end with sales-guidance system 301 ignoring the non-matching sound. Sales-guidance system 301 identifies the corresponding source indicated by the matching signature as being the source of the sound isolated from the audio (504). That is, if the matching signature corresponds to a baby crying, then sales-guidance system 301 determines that the source of the isolated sound is also a baby crying. After identifying the source of the sound, sales-guidance system 301 identifies a characteristic that corresponds to the source (505). Sales-guidance system 301 may reference information that indicates sound sources and the respective characteristics associated therewith. The characteristics may be user defined or obtained from some other source (e.g., a machine learning algorithm may analyze conversations to determine that a dog barking indicates the caller is a dog owner). In some examples, different sounds may correspond to the same characteristic. For instance, rather than differentiating between types of pets, multiple pet sounds (e.g., dogs barking, cat meowing, bird calling, etc.) may all correspond to a characteristic of user 341 being a pet owner.

Referring back to operational scenario 400, sales-guidance system 301 uses the characteristic to generate an instruction at step 6 for agent endpoint 304 to provide sales guidance to agent 324. The instruction may direct agent endpoint 304 to display a text-based message, display a graphic, play an audio message, open an application, open a particular interface of an application, or provide information intended to guide agent 324 with sales in some other manner—including combinations thereof. Sales-guidance system 301 may reference information that indicates characteristics and respective items of sales guidance corresponding thereto. Sales-guidance system 301 may then generate the instruction to provide the sales guidance that corresponds to the characteristic identified in step 5. In some examples, sales-guidance system 301 may identify multiple characteristics through the performance of operation 500 on additional sound(s). The instruction may, therefore, be generated to account for more than one characteristic. In some examples, the information referenced by sales-guidance system 301 to determine the sales guidance may include a push list created by the entity represented by agents 324-327. The push list identifies products/services that the entity wants agents 324-327 to offer (or push) to customers to increase sales of those products. In addition to listing products/services that the agent should offer to customers, the push list may indicate deals (e.g., sales) on those products to entice customers. Sales-guidance system 301 may reference the push list to determine which products/service should be offered to user 341 based on user 341 having the identified characteristic. The instruction directs agent endpoint 304 to tell user 341 to push the products/services to user 341.

The push list may include all products/services that the entity wants pushed to customers or may include only a subset of those product/services. The subset may include only those products/services that agent 324 would not be expected to know. For instance, if agent 324 is trained on electronics, then the push list may include products/services other than those that an electronics-focused agent would likely already know to push. In some examples, sales-guidance system 301 may use the same push list for all agents and ignore products/services in that push list that a particular agent would already be expected to know (e.g., an electronics-focused agent may be expected to already know to push a particular television listed in the push list). In some examples, sales-guidance system 301 may still provide sales guidance to push products/services that the agent is expected to know to ensure the products/services are pushed (e.g., an agent may forget about items they are supposed to be pushing or may not have studied the push list in their focus area thoroughly). In some cases, sales-guidance system 301 may not identify a characteristic corresponding to an identified sound or may not identify a push list item corresponding to the identified characteristic. In those cases, sales-guidance system 301 may simply not provide any sales guidance to agent 324 or may explicitly note to agent 324 that no sales guidance is available. Essentially, if one were to consider a Venn diagram of push list items and items in which the characteristic indicates user 341 may be interested, then any item that overlaps between those two categories will be included in the sales guidance. If sales-guidance system 301 determines user 341 has a characteristic that does not correspond to a push list item, then no push list item for that characteristic is indicated in the sales guidance because the characteristic would not fall into the diagram overlap.

Upon generating the instruction, sales-guidance system 301 includes the instruction in a message and transmits the message at step 7 to agent endpoint 304. The message may be in any format that agent endpoint 304 can receive over internal network 308 and execute either natively or through an application executing thereon. Upon receiving the message, agent endpoint 304 executes the instruction at step 8 to provide agent 324 with the sales guidance intended by sales-guidance system 301. For example, if the instruction is for agent endpoint 304 to display a text message or other information to agent 324, agent endpoint 304 displays that text message. The information may be displayed in a dedicated popup window, a messaging interface, a notification center, or in some other user interface element of agent endpoint 304.

Preferably, steps 5-8 occur in real time so that agent 324 can receive the sales guidance and act upon that guidance before an opportune moment for addressing the identified sound passes. Steps 5-8 may repeat throughout the call to provide additional sales guidance in response to additional sounds identified during the call. For example, sales-guidance system 301 may first provide sales guidance based on hearing a dog barking and then guidance based on hearing a baby crying. In some examples, sales-guidance system 301 may also monitor audio from agent endpoint 304 over the call, or other actions performed on agent endpoint 304, to determine whether agent 324 follows the guidance. If sales-guidance system 301 does not identify anything indicating that agent 324 followed the guidance (e.g., does not "hear" anything in the audio of agent 324 selling the products/services mentioned in the guidance), then sales-guidance system 301 may send a note to agent 324's supervisor indicating that agent 324 may require additional oversight. Similarly, sales-guidance system 301 may monitor user 341's response to agent 324's actions regarding the sales guidance to determine whether the sales guidance should be implemented differently for future callers. For instance, sales-guidance system 301 may determine that agent 324's approach to the sales guidance was not well received by user 341 and may, therefore, adjust how the sales guidance is given to agent 324 in the future (e.g., sales-guidance system 301 may provide a script for future interactions rather than relying on agent 324 to come up with their own sales pitch).

Figure 6:
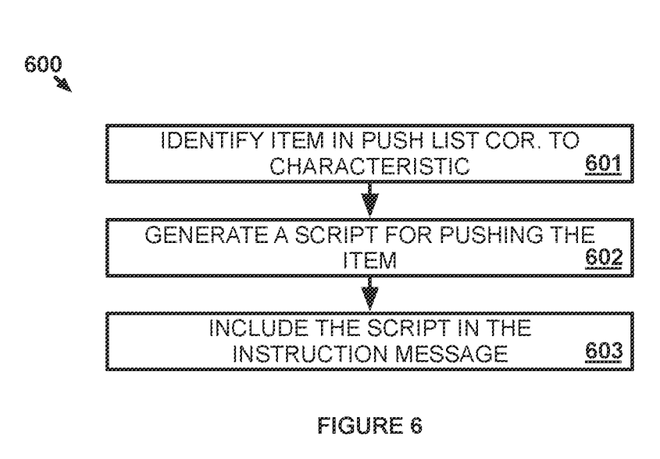
FIG. 6 illustrates an operation to guide an agent on a real-time communication session based on background sound identified during the communication session.

FIG. 6 illustrates operation 600 to guide an agent on a real-time communication session based on background sound identified during the communication session. Operation 600 is an example of sales-guidance system 301 generating information for presentation to agent 324 as sales guidance in step 6 of operational scenario 400. During operation 600, sales-guidance system 301 identifies an item in a push list that corresponds to the determined characteristic of user 341 (601). For example, if the characteristic is that user 341 is a parent of a baby, then the corresponding item in the push list may be a special on baby food (e.g., buy one pouch and get one free). Sales-guidance system 301 then generates a script for agent 324 to follow to push the item (602). The script ensures agent 324 presents the item in a desirable manner. Sales-guidance system 301 may use context determined from the user communications already exchanged on the call to select wording for the script. For instance, the script may include a segue to a discussion about the push list item based on the topic currently being discussed. A natural language generation algorithm may be used to ensure the words and sentence structure do not seem awkward to user 341 as the listener. In some examples, sales-guidance system 301 may include preformed sentence segments into full sentences for agent 324 to speak to user 341 over the call. Other mechanisms for generating the script may also be used.

Sales-guidance system 301 includes the script in the instructions that are sent in the message to agent endpoint 304 in operational scenario 400 (603). In some examples, agent endpoint 304 displays the script in response to receiving the instruction message. Agent 324 need simply read the script to user 341 when agent 324 feels it would be appropriate within the context of the user communications. Agent 324 can then handle user 341's reaction to hearing the script on their own. In some examples, agent endpoint 304 may synthesize a voice using a text-to-speech algorithm on the script for presentation to agent 324 by agent endpoint 304 through a speaker element (e.g., a headset worn by agent 324). Agent 324 can then simply repeat what agent 324 hears from agent endpoint 304 over the call to user 341.

Figure 7:
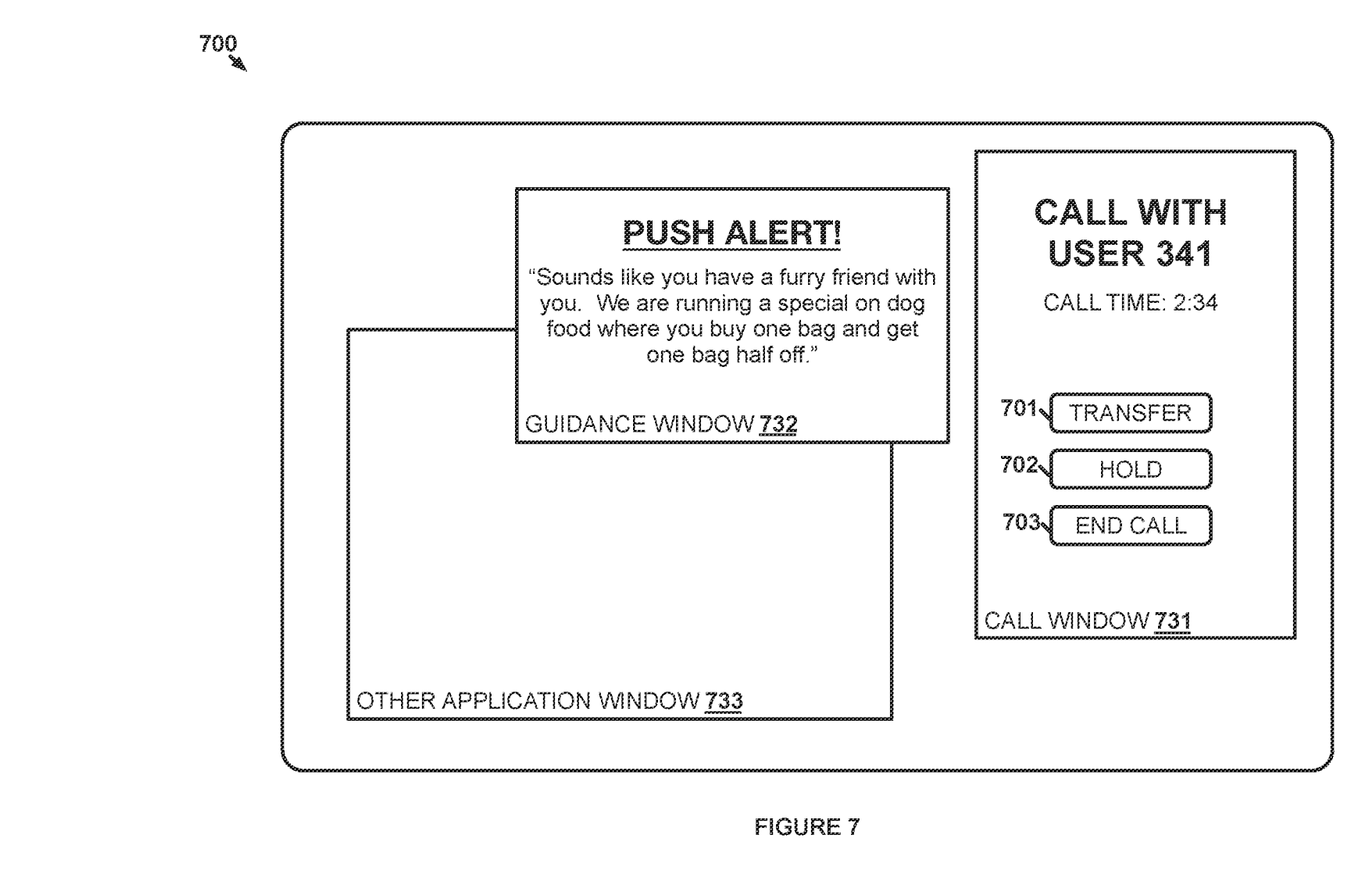
FIG. 7 illustrates a display for guiding an agent on a real-time communication session based on background sound identified during the communication session.

FIG. 7 illustrates display 700 for guiding an agent on a real-time communication session based on background sound identified during the communication session. Display 700 is an example display of agent endpoint 304. Specifically, display 700 is showing what agent endpoint 304 may display to agent 324 upon receiving the instruction message from sales-guidance system 301. In this example, display 700 is displaying a graphical user interface with call window 731, sales-guidance window 732, and other-application window 733. Call window 731 is a window of a client facilitating the call with caller endpoint 311. Call window 731 includes transfer button 701, hold button 702, and end-call button 703, which enable agent 324 to transfer the call to another agent, hold the call, and end the call, respectively, when selected by agent 324. Other call interfaces may include different options for agent 324. Other-application window 733 may be a window of an application agent 324 operates to service customer calls (e.g., to place orders on behalf of customers). In this example, sales-guidance system 301 identifies a sound indicating that user 341 is a dog owner and generates a script for pushing dog food to user 341. Agent endpoint 304 receives an instruction from sales-guidance system 301 and opens sales-guidance window 732 to display the script as sales guidance to agent 324. Agent 324 can then read the script in sales-guidance window 732 in an attempt to sell dog food to user 341. Even if agent 324 was ignoring background sound on the call (i.e., the dog barking in this case), sales-guidance system 301 is able to provide sales guidance to agent 324 based on that sound. Agent 324 further required no previous knowledge of the dog food sale to provide user 341 with a dog food offer thanks to sales-guidance system 301's guidance.

Figure 8:
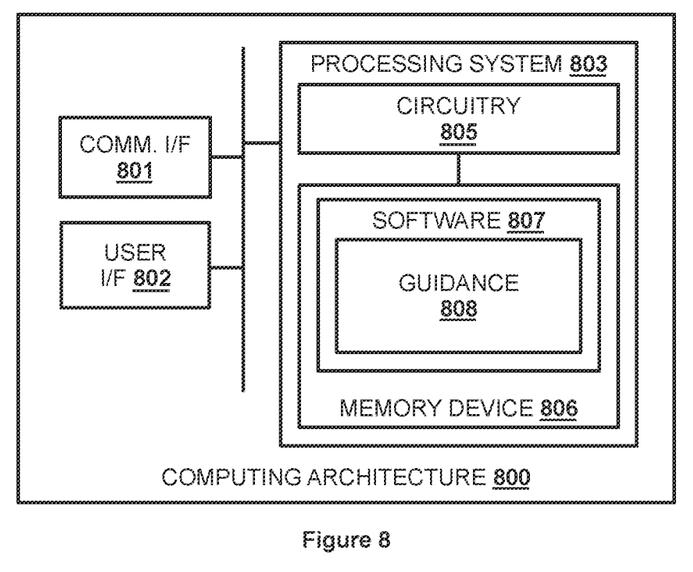
FIG. 8 illustrates a computing architecture for guiding an agent on a real-time communication session based on background sound identified during the communication session.

FIG. 8 illustrates computing architecture 800 for guiding an agent on a real-time communication session based on background sound identified during the communication session. Computing architecture 800 is an example computing architecture for sales-guidance systems 101 and 301, although systems 101 and 301 may use alternative configurations. Computing architecture 800 may also be used for other computing systems described herein, such as the described endpoints. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 includes guidance module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, guidance module 808 directs processing system 803 to receive audio from a first endpoint operated by a first user. The audio is received over a real-time communication session established between the first endpoint and a second endpoint operated by an agent of a contact center. Guidance module 808 further directs processing system 803 to identify sound other than a voice of the first user from the audio and determine a characteristic of the first user indicated by the sound. During the communication session, guidance module 808 directs processing system 803 to provide sales guidance to the agent based on the characteristic.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
in a computing system connected to a second endpoint;
receiving audio from a first endpoint operated by a first user, wherein the audio is received over a real-time communication session established between the first endpoint and the second endpoint operated by an agent of a contact center;

isolating sound other than a voice of the first user from the audio;
comparing the sound to a plurality of sound signatures from a plurality of known sources;
identifying a matching signature from the plurality of sound signatures that matches the sound, wherein the matching signature corresponds to a source of the known sources;
determining a characteristic of the first user indicated by the source; and
during the communication session, providing sales guidance to the agent based on the characteristic, wherein the sales guidance includes information to assist the agent to sell a product or service corresponding to the characteristic.

2. The method of claim 1, wherein providing the sales guidance comprises:
determining the information including an instruction for handling the first user based on the characteristic; and
presenting the instruction to the agent via the second endpoint.

3. The method of claim 2, wherein determining the instruction comprises:
determining an item corresponding to the characteristic in a push list, wherein the item is one of a plurality of items in the push list that correspond to different characteristics; and
generating the instruction, wherein the instruction directs the agent to push the item to the first user.

4. The method of claim 2, wherein determining the instructions comprises:
determining a cause of a change of behavior of the first user indicated by the characteristic; and
generating the instruction, wherein the instruction directs the agent on how to account for the change in view of the cause.

5. The method of claim 4, comprising:
identifying the change of behavior at substantially the same time as the sound.

6. The method of claim 2, wherein presenting the instruction comprises:
displaying the instruction to the agent from the second endpoint.

7. The method of claim 2, wherein presenting the instruction comprises:
audibly speaking the instruction to the agent from the second endpoint.

8. The method of claim 1, wherein providing the sales guidance comprises:
presenting an indicator of the characteristic to the agent from the second endpoint.

9. The method of claim 1, wherein the sales guidance includes a script for the agent to read over the communication session.

10. The method of claim 1, comprising:
isolating a second sound in the audio;
comparing the second sound to the plurality of sound signatures; and
in response to not finding a second matching signature from the plurality of sound signatures that matches the second sound, ignoring the second sound.

11. An apparatus comprising:
one or more computer readable storage media;
a processing system operatively coupled with the one or more computer readable storage media; and
program instructions stored on the one or more computer readable storage media that, when read and executed by the processing system, direct the apparatus to:
receive audio from a first endpoint operated by a first user, wherein the audio is received over a real-time communication session established between the first endpoint and a second endpoint operated by an agent of a contact center;
isolate sound other than a voice of the first user from the audio;
compare the sound to a plurality of sound signatures from a plurality of known sources;
identify a matching signature from the plurality of sound signatures that matches the sound, wherein the matching signature corresponds to a source of the known sources;
determine a characteristic of the first user indicated by the source; and
during the communication session, provide sales guidance to the agent based on the characteristic, wherein the sales guidance includes information to assist the agent to sell a product or service corresponding to the characteristic.

12. The apparatus of claim 11, wherein to provide the sales guidance, the program instructions direct the apparatus to:
determine the information including an instruction for handling the first user based on the characteristic; and
present the instruction to the agent via the second endpoint.

13. The apparatus of claim 12, wherein to determine the instruction, the program instructions direct the apparatus to:
determine an item corresponding to the characteristic in a push list, wherein the item is one of a plurality of items in the push list that correspond to different characteristics; and
generate the instruction, wherein the instruction directs the agent to push the item to the first user.

14. The apparatus of claim 12, wherein to determine the instructions, the program instructions direct the apparatus to:
determine a cause of a change of behavior of the first user indicated by the characteristic; and
generate the instruction, wherein the instruction directs the agent on how to account for the change in view of the cause.

15. The apparatus of claim 14, wherein the program instructions direct the apparatus to:
identify the change of behavior at substantially the same time as the sound.

16. The apparatus of claim 12, wherein to present the instruction, the program instructions direct the apparatus to:
display the instruction to the agent from the second endpoint.

17. The apparatus of claim 12, wherein to present the instruction, the program instructions direct the apparatus to:
audibly speak the instruction to the agent from the second endpoint.

18. The apparatus of claim 11, wherein to provide the sales guidance, the program instructions direct the apparatus to:
present an indicator of the characteristic to the agent from the second endpoint.

19. The apparatus of claim 11, wherein the sales guidance includes a script for the agent to read over the communication session.

20. One or more computer readable storage media having program instructions stored thereon that, when read and executed by a processing system, direct the processing system to:
- receive audio from a first endpoint operated by a first user, wherein the audio is received over a real-time communication session established between the first endpoint and a second endpoint operated by an agent of a contact center;
- isolate sound other than a voice of the first user from the audio;
- compare the sound to a plurality of sound signatures from a plurality of known sources;
- identify a matching signature from the plurality of sound signatures that matches the sound, wherein the matching signature corresponds to a source of the known sources;
- determine a characteristic of the first user indicated by the source; and
- during the communication session, provide sales guidance to the agent based on the characteristic, wherein the sales guidance includes information to assist the agent to sell a product or service corresponding to the characteristic.

* * * * *